United States Patent
Yoshikawa

(10) Patent No.: US 9,099,874 B2
(45) Date of Patent: Aug. 4, 2015

(54) BATTERY STATE MONITORING CIRCUIT AND BATTERY DEVICE

(75) Inventor: Kiyoshi Yoshikawa, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 1135 days.

(21) Appl. No.: 13/069,865

(22) Filed: Mar. 23, 2011

(65) Prior Publication Data

US 2011/0234169 A1  Sep. 29, 2011

(30) Foreign Application Priority Data

Mar. 26, 2010 (JP) .................... 2010-073334

(51) Int. Cl.
*H02J 7/00* (2006.01)
*H01M 10/48* (2006.01)

(52) U.S. Cl.
CPC ............ *H02J 7/0031* (2013.01); *H01M 10/48* (2013.01)

(58) Field of Classification Search
CPC ..................................................... H02J 7/0031
USPC .......... 320/131, 132, 134–136, 150, 152, 153
See application file for complete search history.

(56) References Cited

U.S. PATENT DOCUMENTS 7,948,212 B2 * 5/2011 Odaohhara .................... 320/150
2009/0160405 A1 * 6/2009 Takeda et al. ................. 320/152

FOREIGN PATENT DOCUMENTS

JP  2007-124775 A  5/2007

* cited by examiner

*Primary Examiner* — Richard V Muralidar
(74) *Attorney, Agent, or Firm* — Brinks Gilson & Lione

(57) ABSTRACT

Provided is a battery state monitoring circuit including: a charge/discharge control circuit for detecting and controlling a state of a secondary battery; a temperature sensor circuit connected to an overcurrent detection terminal; an amplifier for comparing a reference voltage and a divided voltage of the overcurrent detection terminal; and a transistor that receives an output signal of the amplifier, for controlling a charge control output terminal. When a charger is connected in a state in which the secondary battery has an ultra-low voltage, a charge control FET is controlled so that a constant voltage may appear between output terminals, to thereby ensure an operating voltage of the temperature sensor circuit to enable an overheat protection function.

3 Claims, 3 Drawing Sheets

BATTERY STATE MONITORING CIRCUIT AND BATTERY DEVICE

RELATED APPLICATIONS

This application claims priority under 35 U.S.C. §119 to Japanese Patent Application No. 2010-073334 filed on Mar. 26, 2010, the entire content of which is hereby incorporated by reference.

BACKGROUND OF THE INVENTION

1. Field of the Invention

The present invention relates to a battery state monitoring circuit for detecting a voltage and an abnormality of a secondary battery and a battery device including the battery state monitoring circuit, and more particularly, to a battery state monitoring circuit incorporating a temperature sensor in a charge/discharge control circuit and a battery device including the battery state monitoring circuit.

2. Description of the Related Art

FIG. 3 illustrates a circuit diagram of a conventional battery device incorporating a temperature sensor. The conventional battery device incorporating the temperature sensor includes a secondary battery 101, an overcharge detection circuit 301, an overdischarge detection circuit 305, a control circuit 302, an overheat detection circuit 304, a temperature sensor 307, an overcurrent detection circuit 303, a discharge field-effect transistor (FET) 306, a charge FET 308, an external terminal 106, and an external terminal 107.

Connection is made as follows. The positive terminal side of the secondary battery 101 is connected to the overcharge detection circuit 301, the overdischarge detection circuit 305, and the external terminal 106, and the negative terminal side thereof is connected to a source of the discharge FET 306. The control circuit 302 is connected to an output of the overcharge detection circuit 301, an output of the overdischarge detection circuit 305, an output of the overcurrent detection circuit 303, and an output of the overheat detection circuit 304. The discharge FET 306 has a gate connected to an output of the control circuit 302 and a drain connected to a drain of the charge FET 308. The charge FET 308 has a gate connected to another output of the control circuit 302 and a source connected to an input of the overcurrent detection circuit 303 and the external terminal 107.

When the charge FET 308 enters an abnormal overheated state due to overcurrent during charge, the overheat detection circuit 304 notifies the control circuit 302 of the abnormal state so that the control circuit 302 operates to change the gate of the charge FET 308 to L to disconnect a charge current. Therefore, the charge FET 308 for charge control can be protected from abnormal overheat (see, for example, Japanese Patent Application Laid-open No. 2007-124775).

However, the conventional technology has a problem that the overheat detection circuit cannot operate when the secondary battery is charged from an ultra-low voltage (around 0 V) after long-term standing.

SUMMARY OF THE INVENTION

The present invention has been made to solve the problem described above, and provides a battery state monitoring circuit in which an overheat protection circuit operates for overheat protection when a charger is connected even if a secondary battery voltage is an ultra-low voltage, and also provides a battery device including the battery state monitoring circuit.

In order to solve the conventional problem, a battery device including a battery state monitoring circuit according to the present invention has the following configuration.

A battery state monitoring circuit includes: a charge/discharge control circuit for detecting and controlling a state of a secondary battery; a temperature sensor circuit connected to an overcurrent detection terminal; an amplifier for comparing a reference voltage and a divided voltage of the overcurrent detection terminal; and a transistor that receives an output signal of the amplifier, for controlling a charge control output terminal.

According to the battery device of the present invention, immediately after the charger is connected, the amplifier compares the output of the reference voltage circuit and the divided voltage of the overcurrent detection terminal, and outputs a signal to control the transistor, with the result that the voltage of the overcurrent detection terminal can be maintained to be a constant voltage higher than a minimum operating voltage of the temperature sensor circuit so that the temperature sensor circuit can operate.

DETAILED DESCRIPTION OF THE PREFERRED EMBODIMENTS

Referring to the accompanying drawings, modes for embodying the present invention are described.

First Embodiment

Figure 1:
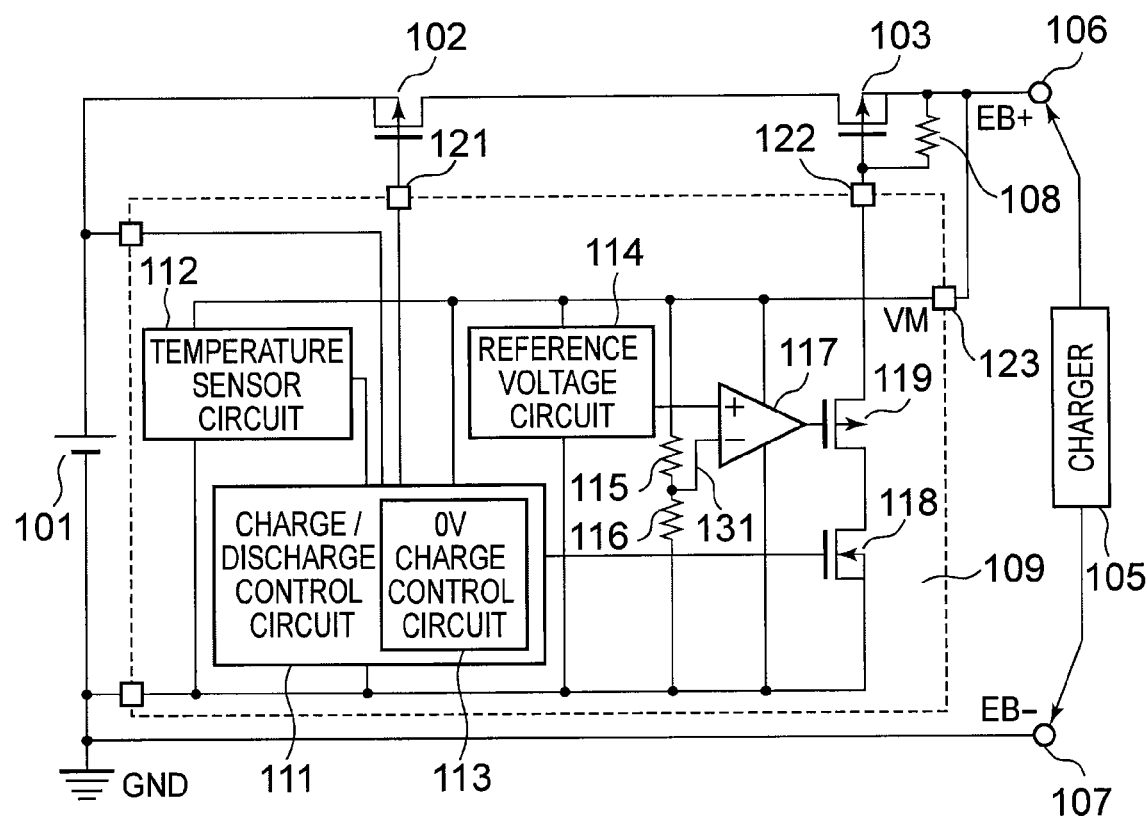
FIG. 1 is a circuit diagram of a battery device including a battery state monitoring circuit according to a first embodiment of the present invention.

FIG. 1 is a circuit diagram of a battery device including a battery state monitoring circuit according to a first embodiment of the present invention.

The battery device according to the first embodiment includes a secondary battery 101, a discharge control P-channel field-effect transistor (FET) 102, a charge control P-channel FET 103, external terminals 106 and 107 to which a charger 105 is to be connected, a charge/discharge control circuit 111, a temperature sensor circuit 112, a 0 V charge control circuit 113, a reference voltage circuit 114, resistors 115 and 116, an amplifier 117, an NMOS transistor 118, and a PMOS transistor 119.

The charge/discharge control circuit 111 uses the secondary battery 101 as power supply. The temperature sensor circuit 112, the 0 V charge control circuit 113, the reference voltage circuit 114, and the amplifier 117 are each connected to an overcurrent detection terminal 123 for positive power supply and connected to a negative terminal of the secondary battery 101 for negative power supply.

The temperature sensor circuit 112 has an output connected to the 0 V charge control circuit 113. The charge/discharge control circuit 111 has an input connected to the overcurrent detection terminal 123, one output connected to a discharge control output terminal 121, and another output connected to the 0 V charge control circuit 113. The NMOS transistor 118 has a gate connected to an output of the 0 V charge control circuit 113, a source connected to the negative terminal of the secondary battery 101, and a drain connected to a drain of the PMOS transistor 119. The resistor 115 has one end connected to the overcurrent detection terminal 123 and the other end connected to the resistor 116. The resistor 116 has one end connected to the negative terminal of the secondary battery 101 and the other end connected to the resistor 115. The amplifier 117 has a non-inverting input terminal connected to an output of the reference voltage circuit 114, an inverting input terminal connected to a node 131 between the resistors 115 and 116, and an output connected to a gate of the PMOS transistor 119. The PMOS transistor 119 has a source connected to a charge control output terminal 122. The discharge control P-channel FET 102 has a gate connected to the discharge control output terminal 121, a source connected to the positive terminal of the secondary battery 101, and a drain connected to a drain of the charge control P-channel FET 103. The charge control P-channel FET 103 has a gate connected to the charge control output terminal 122 and a source connected to the external terminal 106. A resistor 108 has one end connected to the charge control output terminal 122 and another end connected to the external terminal 106. The overcurrent detection terminal 123 is connected to the external terminal 106, and the external terminal 107 is connected to the negative terminal of the secondary battery 101.

Next, an operation of the battery device according to the first embodiment is described.

In a state in which the secondary battery 101 has an ultra-low voltage (around 0 V) after long-term standing, a charger 105 is connected between the external terminals 106 and 107. Immediately after the charger 105 is connected, because the overcurrent detection terminal 123 has the ultra-low voltage, the 0 V charge control circuit 113 outputs H to turn ON the NMOS transistor 118. At this time, the PMOS transistor 119 is turned OFF and accordingly a voltage of the charge control terminal 122 becomes equal to that of the external terminal 106 to turn OFF the charge control P-channel FET 103. When the voltage of the overcurrent detection terminal 123 increases from the ultra-low voltage (around 0 V) and the node 131 has a voltage exceeding an output voltage of the reference voltage circuit 114, the amplifier 117 outputs L to turn ON the PMOS transistor 119. Then, the voltage of the charge control terminal 122 is changed to L to turn ON the charge control P-channel FET 103, with the result that the overcurrent detection terminal 123 is connected to the positive terminal of the secondary battery 101 to be reduced in voltage.

When the voltage of the node 131 falls below the output voltage of the reference voltage circuit 114, the output voltage of the amplifier 117 increases to reduce a current flowing through the PMOS transistor 119. Then, the voltage of the charge control terminal 122 becomes close to the voltage of the external terminal 106, and the charge control P-channel FET 103 performs analog operation to reduce the current to flow. Then, the voltage of the overcurrent detection terminal 123 increases again. The action of feedback described above allows the voltage of the overcurrent detection terminal 123 to be a constant value determined by multiplying the output voltage of the reference voltage circuit 114 by a "resistance of the resistor 116/(a resistance of the resistor 115+a resistance of the resistor 116)". With this voltage set to be equal to or higher than a minimum operating voltage of the temperature sensor circuit 112, the temperature sensor circuit 112 can operate immediately after the charger 105 is connected. Therefore, even in the case of charging the secondary battery 101 having the ultra-low voltage, the overheat protection function can work immediately after the charger 105 is connected.

Second Embodiment

Figure 2:
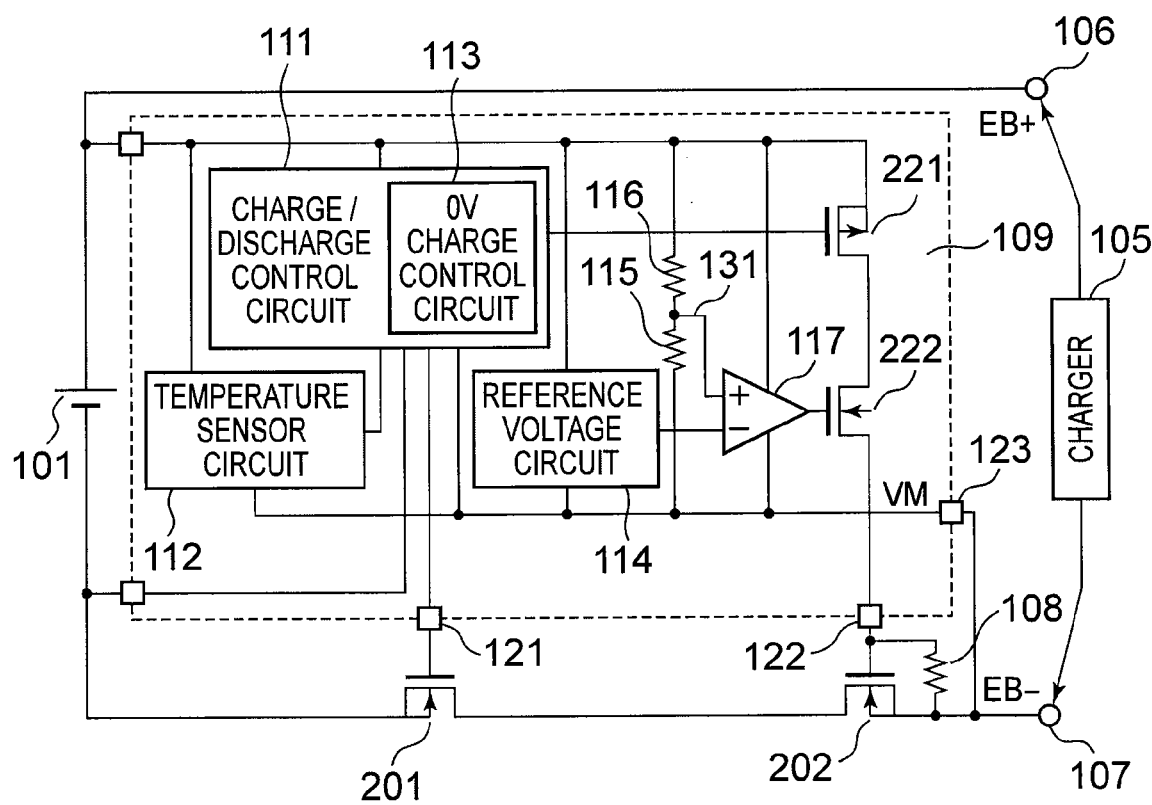
FIG. 2 is a circuit diagram of a battery device including a battery state monitoring circuit according to a second embodiment of the present invention.
Figure 3:
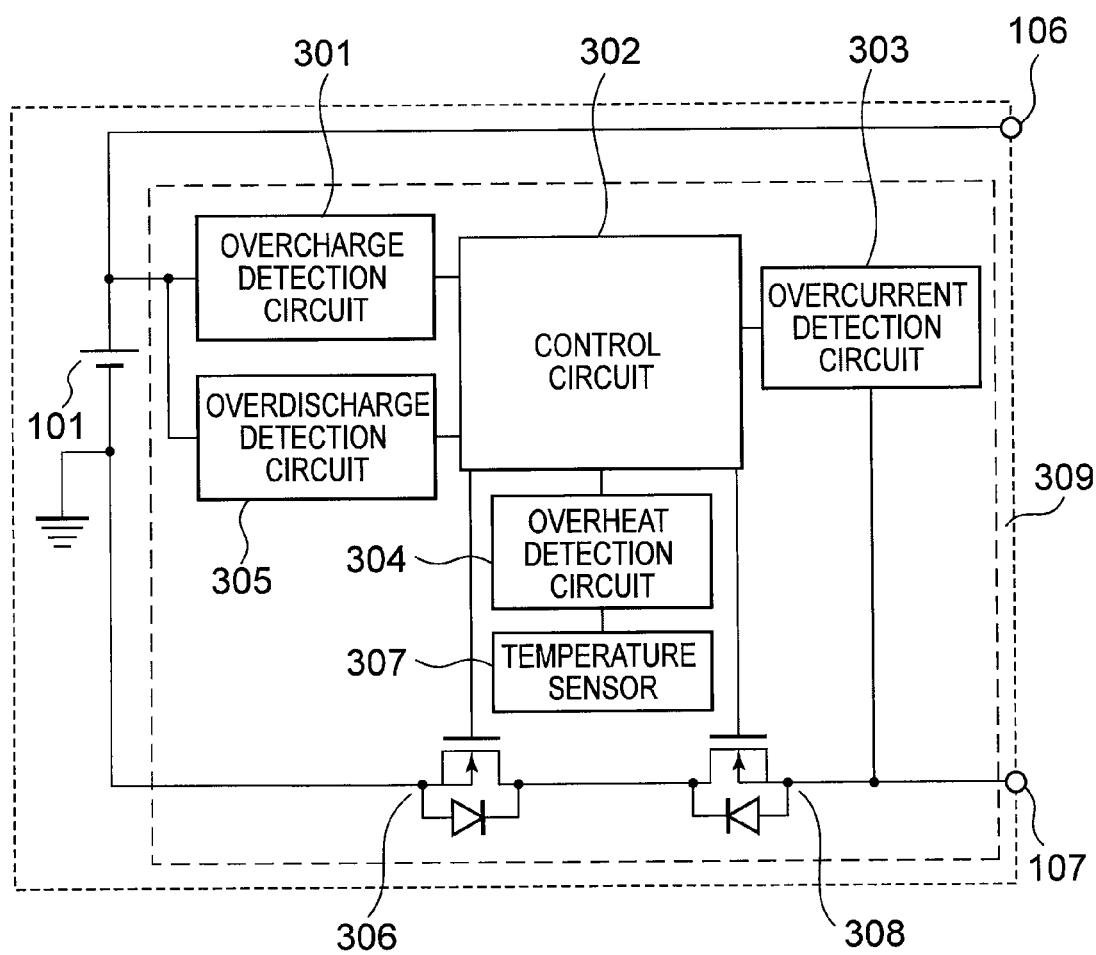
FIG. 3 is a circuit diagram of a conventional battery device including a battery state monitoring circuit.

FIG. 2 is a circuit diagram of a battery device including a battery state monitoring circuit according to a second embodiment of the present invention. FIG. 2 is different from FIG. 1 in that the discharge control P-channel FET 102, the charge control P-channel FET 103, the NMOS transistor 118, and the PMOS transistor 119 are changed to a discharge control N-channel FET 201, a charge control N-channel FET 202, a PMOS transistor 221, and an NMOS transistor 222, respectively.

Connection is made as follows. The charge/discharge control circuit 111 uses the secondary battery 101 as power supply. The temperature sensor circuit 112, the 0 V charge control circuit 113, the reference voltage circuit 114, and the amplifier 117 are each connected to the positive terminal of the secondary battery 101 for positive power supply and connected to the overcurrent detection terminal 123 for negative power supply.

The discharge control N-channel FET 201 has a gate connected to the discharge control output terminal 121, a source connected to the negative terminal of the secondary battery 101, and a drain connected to a drain of the charge control N-channel FET 202. The charge control N-channel FET 202 has a gate connected to the charge control output terminal 122 and a source connected to the external terminal 107. The amplifier 117 has an inverting input terminal connected to the output of the reference voltage circuit 114, a non-inverting input terminal connected to the node 131 between the resistors 115 and 116, and an output connected to a gate of the NMOS transistor 222. The NMOS transistor 222 has a source connected to the charge control terminal 122. The PMOS transistor 221 has a gate connected to the output of the 0 V charge control circuit 113, a source connected to the positive terminal of the secondary battery 101, and a drain connected to a drain of the NMOS transistor 222.

Next, an operation of the battery device according to the second embodiment is described.

In a state in which the secondary battery 101 has an ultra-low voltage (around 0 V) after long-term standing, the charger 105 is connected between the external terminals 106 and 107. Immediately after the charger 105 is connected, because the overcurrent detection terminal 123 has the ultra-low voltage, the 0 V charge control circuit 113 outputs L to turn ON the PMOS transistor 221. At this time, the NMOS transistor 222 is turned OFF and accordingly a voltage of the charge control terminal 122 becomes equal to that of the external terminal 107 to turn OFF the charge control N-channel FET 202. When the voltage of the overcurrent detection terminal 123 decreases from the ultra-low voltage (around 0 V) and the node 131 has a voltage exceeding an output voltage of the reference voltage circuit 114, the amplifier 117 outputs H to turn ON the NMOS transistor 222. Then, the voltage of the charge control terminal 122 is changed to H to turn ON the charge control N-channel FET 202, with the result that the overcurrent detection terminal 123 is connected to the negative terminal of the secondary battery 101 to be increased in voltage.

When the voltage of the node 131 falls below the output voltage of the reference voltage circuit 114, the output voltage of the amplifier 117 decreases to reduce a current flowing through the NMOS transistor 222. Then, the voltage of the charge control terminal 122 becomes close to the voltage of the external terminal 107, and the charge control N-channel FET 202 performs analog operation to reduce the current to flow. Then, the voltage of the overcurrent detection terminal 123 decreases again. The action of feedback described above allows the voltage between the external terminal 106 and the overcurrent detection terminal 123 to be a constant value determined by multiplying the output voltage of the reference voltage circuit 114 by a "resistance of the resistor 115/(a resistance of the resistor 115+a resistance of the resistor 116)". With this voltage set to be equal to or higher than a minimum operating voltage of the temperature sensor circuit 112, the temperature sensor circuit 112 can operate immediately after the charger 105 is connected. Therefore, even in the case of charging the secondary battery 101 having the ultra-low voltage, the overheat protection function can work.

What is claimed is:

1. A battery state monitoring circuit, comprising:
   a charge/discharge control circuit for detecting and controlling a state of a secondary battery;
   a temperature sensor circuit connected to an overcurrent detection terminal;
   an amplifier for comparing a reference voltage and a divided voltage of the overcurrent detection terminal; and
   a transistor that receives an output signal of the amplifier, for controlling a charge control output terminal,
   wherein when the divided voltage of the overcurrent detection terminal is below the reference voltage, the amplifier controls the transistor, which in turn controls the charge control output terminal to limit an amount of current flowing to the secondary battery to thereby prevent a magnitude of a voltage present on the overcurrent detection terminal from dropping below a level that facilitates operation of the temperature sensor circuit.

2. A battery device, comprising:
   a chargeable/dischargeable secondary battery;
   a charge/discharge control switch provided in a charge/discharge path of the chargeable/dischargeable secondary battery; and
   the battery state monitoring circuit according to claim 1, for monitoring a voltage of the chargeable/dischargeable secondary battery and opening/closing the charge/discharge control switch to control charge/discharge of the chargeable/dischargeable secondary battery.

3. A battery state monitoring circuit, comprising:
   a charge/discharge control circuit that includes a charge control terminal for controlling a switch that controls the flow of current from a charger to a secondary battery;
   a temperature sensor circuit that operates from power received from an overcurrent detection terminal of the charge/discharge control circuit;
   an amplifier for comparing a reference voltage and a divided voltage of the overcurrent detection terminal; and
   a transistor that receives an output signal of the amplifier, for controlling the charge control output terminal,
   wherein when the divided voltage of the overcurrent detection terminal is below the reference voltage, the amplifier and controls the transistor, which in turn controls the charge control output terminal to limit an amount of current flowing to the secondary battery to thereby control an output of the charge control terminal of the charge/discharge control circuit to prevent a magnitude of a voltage present on the overcurrent detection terminal from dropping below a level that facilitates operation of the temperature sensor circuit.

* * * * *